F. MACE.
Car-Propellers.

No. 146,834.

Patented Jan. 27, 1874.

Witnesses
J. D. Boone
C. M. Richardson

Inventor
Fayette Mace
per Dewey & Co
Attys.

UNITED STATES PATENT OFFICE.

FAYETTE MACE, OF JACKSON, CALIFORNIA.

IMPROVEMENT IN CAR-PROPELLERS.

Specification forming part of Letters Patent No. 146,834, dated January 27, 1874; application filed December 29, 1873.

*To all whom it may concern:*

Be it known that I, FAYETTE MACE, of Jackson, Amador county, State of California, have invented an Improved Method and Apparatus for Propelling Cars; and I do hereby declare the following description and accompanying drawings are sufficient to enable any person skilled in the art or science to which it most nearly appertains to make and use my said invention or improvement without further invention or experiment.

Figure 1:
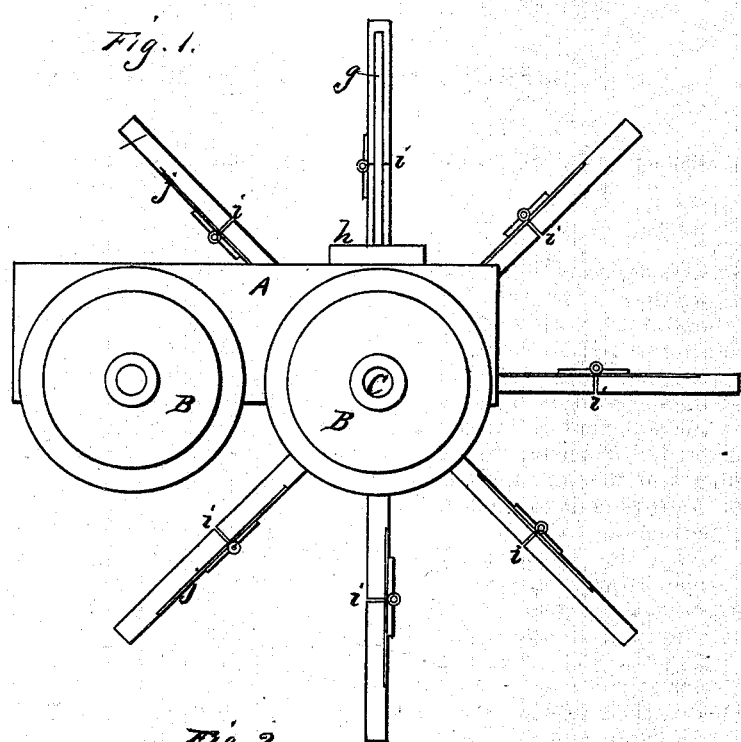
Figure 2:
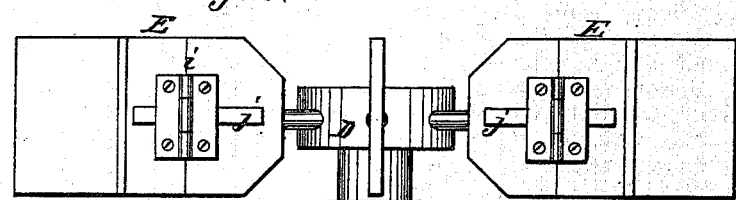
Figure 2:
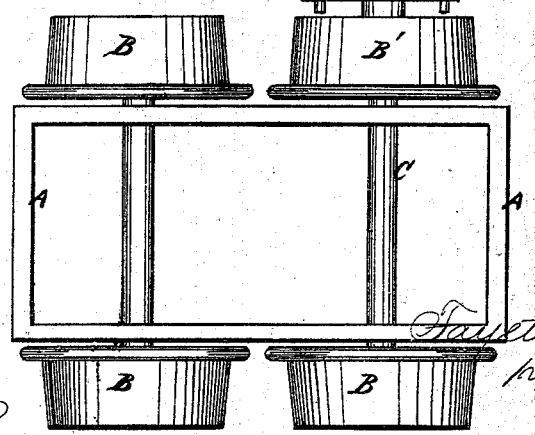

Figure 1 is a side elevation of my device. Fig. 2 is a plan view of same.

A represents a car, which is suitably constructed for carrying freight. This car is provided with wheels B B', similar to ordinary car-wheels, but which revolve loosely upon the axles. One of the axles, C, is extended upon one side to a distance from the car, and has upon its extremity a hub, D. In this hub is secured a series of paddles or buckets, E E, which extend at right angles to the shaft or axle C. A double-acting clutch, F, is arranged to be moved back and forth between the hub D and the car-wheel B', which is next to it upon the same shaft. This clutch is moved back and forth by a lever, g, from the platform h, and is so constructed that when it is moved so as to interlock with the car-wheel B the wheel will be fixed to the shaft, and will revolve with it; but when the clutch is moved in the opposite direction, so as to engage with the hub D, the shaft will be held stationary, while the wheel B is left free to revolve upon it. When the clutch is disengaged from both the wheel and hub, they revolve freely and independent of each other.

The particular form or construction of the clutch and the manner of its engagement are not material, as a double arrangement of the usual clutch-coupling, sliding upon a feather on the shaft, will answer.

The paddles or buckets E E are divided horizontally into two sections at *i*, and these sections are united together by straps or hinges upon one side. A strong spring, *j*, serves to keep them open and in their proper position.

Alongside of a flume, or along the bank of a flowing stream of water, I construct a railroad-track of the ordinary kind, and place the car A upon it. The axle or shaft C must be long enough to carry the hub D over the stream, and the paddles or buckets E E must be long enough to catch the flowing water. Now, when the clutch F is shifted so as to engage with the wheel B', this wheel will be fixed upon the axle, and the force of the current against the paddles or buckets E E will turn the hub, shaft, and wheel, and cause the car to move upon the track in an opposite direction. In case the paddles or buckets should strike against an obstruction in the stream, the force of the current will cause them to yield at the point *i* until the obstruction is passed, when the spring will force them back to their original position.

After the car is stopped, the clutch can be shifted to its position between the hub and wheel, so as to permit the wheel and axle to revolve without affecting the car while it is receiving its load. When the car has been loaded, the clutch is shifted so as to engage with the hub D, so as to hold the shaft or axle C stationary, and leave all of the wheels perfectly free to revolve on their journals. The force of the current against the stationary bucket, which remains in the water, will force the car down the track.

Having thus described my invention, what I claim, and desire to secure by Letters Patent, is—

The car A, with its loosely-revolving wheels B B' and extended axle C, in combination with the paddles E and double-acting clutch F, all constructed as and for the purpose set forth.

In witness whereof I hereunto set my hand and seal.

FAYETTE MACE. [L. S.]

Witnesses:
J. B. STEVENS,
B. H. MACE.